Sept. 4, 1934.     F. W. MEYER     1,972,689
APPARATUS FOR CONTROLLING AND REGULATING DYNAMO ELECTRIC MACHINES
Original Filed April 8, 1918
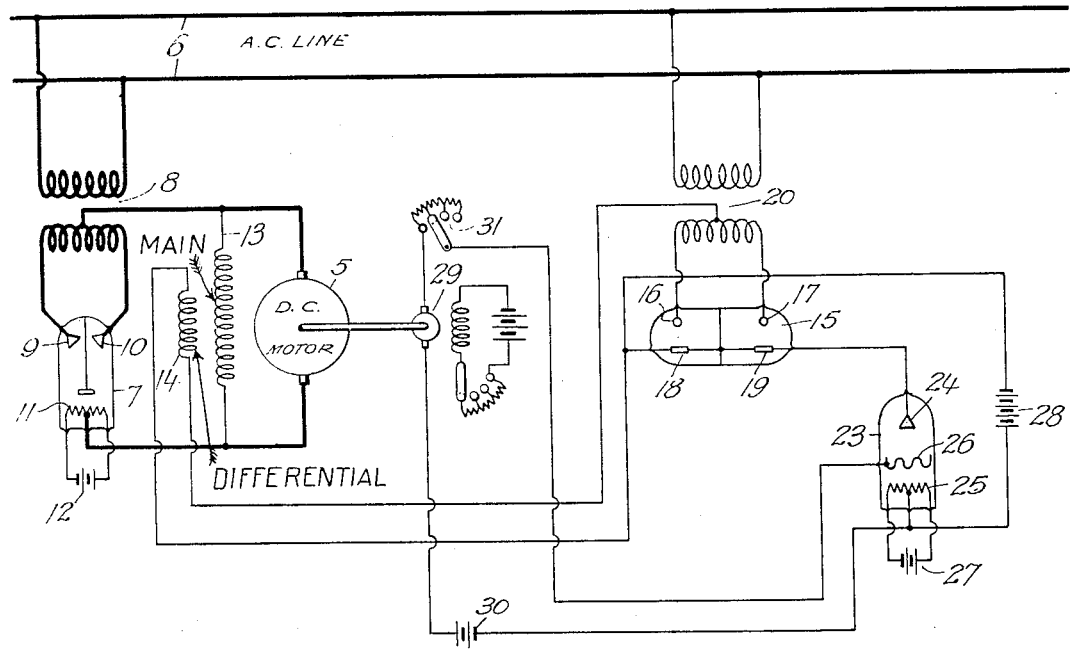
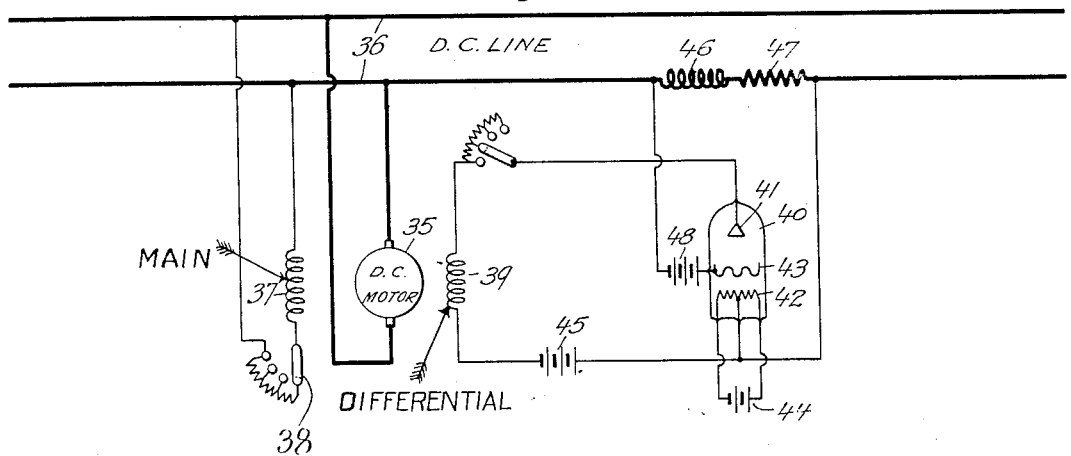

Patented Sept. 4, 1934

1,972,689

UNITED STATES PATENT OFFICE 1,972,689

APPARATUS FOR CONTROLLING AND REGULATING DYNAMO ELECTRIC MACHINES

Friedrich Wilhelm Meyer, Milwaukee, Wis., assignor, by mesne assignments, to Cutler-Hammer, Inc., Milwaukee, Wis., a corporation of Delaware Application April 8, 1918, Serial No. 227,338. Renewed July 17, 1933. In Germany September 20, 1915

1 Claim. (Cl. 171—312)

This invention relates to apparatus for controlling and regulating dynamo electric machines, particularly motors and the like, by regulating and controlling their excitation.

It has been customary to regulate the speed of motors under varying operating conditions by controlling the excitation through the instrumentality of electromagnets, automatic switches and resistances which control the exciting current. The self induction of the electromagnets, the mechanical inertia of the switches and the inertia and self induction of the motor and other things tend to make the regulation tardy and cause it to overrun and hunt, and the resistances consume considerable energy.

One of the objects of this invention is to produce more sensitive, stable and efficient regulation for electric motors and the like by improved means for controlling the excitation.

Another object is to provide improved regulating means which will respond to slight variations in operating conditions and accurately compensate therefor by varying the excitation of the motor.

Another object is to provide improved regulating means which will respond coincidently to slight variations in operating conditions and accurately and coincidently compensate therefor by varying the excitation of the dynamo electric machine.

Another object is to produce an amplified regulating effect upon the occurrence of variations in operating conditions.

Another object is to provide means for facilitating the control of the speed and torque of an electric motor.

Other objects and advantages of the invention will appear from the following specification and claim.

In the accompanying drawing embodiments of the invention are diagrammatically illustrated and will be herein explained as applied to the regulation and control of direct current motors although it will be readily understood that the invention is susceptible of other embodiments and of being adapted for the regulation and control of other types of dynamo electric machines.

In accordance with the embodiments of the invention herein illustrated the excitation of the motor is controlled through an electronic valve which responds to the changes in operating conditions to provide compensation therefor.

In the drawing

Figure 1 shows the controlling and regulating apparatus applied to a direct current motor which receives power from an alternating current source, and Fig. 2 shows modified controlling and regulating apparatus associated with a direct current motor receiving power from a direct current line.

Fig. 1 will first be described.

A direct current motor having an armature 5 receives power from an alternating current line 6 through rectifying apparatus comprising an electronic valve 7 and a transformer 8. The operation and characteristics of the electronic valves illustrated in this and the following figure are explained in my Patent No. 1,353,815, granted September 21, 1920. Valve 7 has a pair of anodes 9 and 10 and a cathode 11 heated by current from a suitable source of energy 12. During one half cycle induced current from line 6 passes to the motor armature through anode 9 and cathode 11. During the other half cycle current passes to the motor through anode 10 and cathode 11. The motor armature is therefore traversed and operated by unidirectional current pulsations. The motor is also provided with a main shunt field winding 13 which receives exciting current from the line in the same manner as that just described for the armature.

The speed of the motor is regulated by controlling the current in an auxiliary differentially wound field winding 14. The exciting current for the auxiliary differential field winding 14 is obtained from the line and is controlled by an electronic valve 15. Valve 15 has a pair of anodes 16 and 17 with co-operating cathodes 18 and 19. The anodes 16 and 17 are connected to the outer terminals of the secondary winding of a transformer 20, the middle of the transformer secondary being connected to one terminal of the auxiliary field winding 14. The other terminal of the auxiliary field winding is connected to the cathodes 18 and 19.

Transformer 20 and the two sets of electrodes 16—18 and 17—19 provide unidirectional pulsatory current from line 6 for the excitation of the auxiliary winding 14. The amount of the current so supplied is dependent upon the heated condition of the cathodes 18 and 19 which are heated electrically. The heating of the cathodes 18 and 19 is varied by an electronic valve 23 which alters the amount of current flowing therethrough. The action of valve or relay 23 is dependent upon the speed of the motor.

Relay 23 is provided with an anode 24 connected to cathodes 18 and 19 of valve 15, a cathode 25 and an auxiliary anode 26 which may take the form of a grid. A battery 27 supplies current for heating the cathode 25. The heating current for cathodes 18 and 19 of valve 15, which is controlled by relay 23, is provided by a battery 28.

An auxiliary dynamo electric machine or tachometer 29 is connected to and simulates the operation of the motor. The tachometer is provided with a suitable adjustable separately excited field. The armature terminals of tachometer 29 are connected to the middle of cathode 25 and auxiliary anode 26 of relay 23 through a battery 30 and a rheostat 31. The voltage of battery 30 opposes the tachometer voltage and normally predominates.

If the speed of the motor decreases the tachometer voltage decreases and the difference in potential between the tachometer and battery 30 increases. This increases the potential between auxiliary anode 26 and cathode 25 of relay 23 and more current is supplied by battery 28 to cathodes 18 and 19 of valve 15. The unidirectional current impulses induced from the line and flowing between anodes 16 and 17 and cathodes 18 and 19 thereupon increase in value and more current flows through the differential field winding 14. The excitation of the motor is therefore decreased and its speed increases. An increase in the speed of the motor results in the opposite effect.

Thus the relay 23 and valve 15 respond coincidently to a change in speed of the motor and coincidently vary the excitation of the motor in accordance with the variations in speed. Consequently, more stable operation of the motor results.

The initial speed and torque of the motor may be varied at will by means of the rheostat 31.

Fig. 2 shows a direct current motor having its armature 35 connected to a source of direct current 36. The motor is provided with a main shunt field winding 37 whose excitation is controlled by a rheostat 38. The speed of the motor under varying operating conditions is regulated by an auxiliary differential field winding 39.

The excitation of auxiliary field winding 39 is controlled by an electronic valve or relay 40. Valve 40 has an anode 41, a cathode 42 and an auxiliary anode 43, which may take the form of a grid. The cathode 42 is heated by current from a battery 44. The auxiliary field winding 39 is connected to main anode 41, and to the middle of cathode 42 of valve 40 in series with a battery 45 which supplies the exciting current for winding 39.

Relay 40 responds to the changes in the operating conditions of the motor through the co-operation of an inductance 46 and a resistance 47 connected in series with the line supplying current thereto. Inductance 46 and resistance 47 are so adjusted and proportioned that their self induction and resistance is at all times proportional to the self induction and resistance of the motor.

The fall of potential over the inductance and resistance therefore at all times represents the operating condition of the motor.

A change in load upon the motor will change the current flowing through the armature and, inasmuch as the armature has inductance and resistance, certain voltage changes will take place in the armature due to its resistance and inductance and this changing current. A corresponding change in voltage drop across 46 and 47 will take place due to this change in current and this voltage drop will be in phase with that of the motor armature due to this change in current, inasmuch as there is the same proportion between inductance and resistance at 46 and 47 as there is in the motor armature. This changed voltage drop will change the current flowing through the valve or relay 40 and will correspondingly change the excitation of the motor to compensate for the change in load thereon. By having the same ratio of inductance and resistance at 46 and 47 and in the motor armature hunting is prevented, because the change in voltage across 46 and 47 is exactly in step with the need for the correction.

The use of the combined inductance and resistance affects the discharge device similarly to a tachometer as previously described in connection with Fig. 1 because the motor current changes and the voltage changes produced by these current changes are effective in controlling the action of the device. Consequently the defects of a mere series winding, such as the differential winding often used, are overcome.

One terminal of the combined inductance and resistance 46 and 47 is connected to the middle of cathode 42. The other terminal of the combined inductance and resistance is connected to the auxiliary anode 43 through a battery 48.

Changes in the speed of the motor change the drop in potential across inductance 46 and resistance 47 which varies the supplemental voltage of the anode 43 and cathode 42. The changes in the supplemental voltage vary the voltage consumed in valve 40 which changes the excitation of the auxiliary field 39 to restore the speed of the motor.

What I claim is:

In combination, a direct current motor having main and auxiliary field windings, a source of alternating current, a rectifier between the source and the motor to supply unidirectional current to the motor armature and the main field winding, a hot cathode electronic valve rectifier connected between the source and the auxiliary field winding to supply unidirectional current to the latter, and means responsive to variations in a characteristic of the motor to vary the temperature of the cathode thereof to control the excitation of the motor.

FRIEDRICH WILHELM MEYER.